United States Patent
Kwon et al.

(10) Patent No.: US 10,606,266 B2
(45) Date of Patent: Mar. 31, 2020

(54) TRACKING A TARGET MOVING BETWEEN STATES IN AN ENVIRONMENT

(71) Applicant: THE BOEING COMPANY, Chicago, IL (US)

(72) Inventors: Hyukseong Kwon, Thousand Oaks, CA (US); David W. Payton, Calabasas, CA (US); Chong Ding, Riverside, CA (US)

(73) Assignee: The Boeing Company, Chicago, IL (US)

( * ) Notice: Subject to any disclaimer, the term of this patent is extended or adjusted under 35 U.S.C. 154(b) by 606 days.

(21) Appl. No.: 15/343,990

(22) Filed: Nov. 4, 2016

(65) Prior Publication Data

US 2018/0128621 A1    May 10, 2018

(51) Int. Cl.
| | |
|---|---|
| *G01C 21/20* | (2006.01) |
| *B64C 39/02* | (2006.01) |
| *G05D 1/10* | (2006.01) |
| *G05D 1/00* | (2006.01) |
| *G01S 13/87* | (2006.01) |
| *G01S 13/72* | (2006.01) |

(52) U.S. Cl.
CPC .......... *G05D 1/0088* (2013.01); *G01S 13/723* (2013.01); *G01S 13/878* (2013.01); *G05D 1/104* (2013.01)

(58) Field of Classification Search
CPC .... G05D 1/104; G05D 1/0088; G05D 1/0094; G01C 21/20; G01S 13/723; G01S 13/878
USPC ............ 702/150; 342/95, 108, 160, 195, 30; 706/12
See application file for complete search history.

(56) References Cited

U.S. PATENT DOCUMENTS

| | | | |
|---|---|---|---|
| 7,420,501 B2 * | 9/2008 | Perl ....................... | G01S 13/872 342/108 |
| 2007/0111746 A1 | 5/2007 | Anderson | |
| 2009/0091490 A1 * | 4/2009 | Tu .......................... | G01S 7/295 342/160 |
| 2011/0048635 A1 | 3/2011 | Mussig et al. | |
| 2012/0030154 A1 * | 2/2012 | Nicholson ............... | G01S 7/003 706/12 |

(Continued)

OTHER PUBLICATIONS

R. Olfati-Saber, "Kalman-Consensus Filter: Optimality, Stability, and Performance", Joint 48th IEEE Conference on Decision and Control and 28th Chinese Control Conference, Sahnghai, P.R. China, Dec. 16-18, 2009, pp. 7036-7042.

(Continued)

*Primary Examiner* — John H Le
(74) *Attorney, Agent, or Firm* — Womble Bond Dickinson (US) LLP

(57) ABSTRACT

An apparatus is provided for tracking a target moving between states using an iterative process. The apparatus receives sensor data for a current state i, and applies a cubature information filter and an H-infinity filter thereto to respectively produce an estimate for the upcoming state i+1 and a measure of error thereof, and adjust the measure of error. The apparatus then defines a consensus estimate of the upcoming state i+1 and a consensus adjusted measure of error thereof from the estimate and adjusted measure of error, and a second estimate and second adjusted measure of error that is received from at least one second apparatus tracking the target. The apparatus then applies a cubature information filter to the consensus estimate of the upcoming state i+1 and the consensus adjusted measure of error to predict the upcoming state i+1.

21 Claims, 4 Drawing Sheets

(56) References Cited

U.S. PATENT DOCUMENTS

2013/0006576 A1     1/2013    Mathews et al.
2016/0371530 A1    12/2016    Kwon et al.

OTHER PUBLICATIONS

W. Li et al., "Consensus-Based Distributed Multiple Model UKF for Jump Markov Nonlinear Systems", IEEE Transactions on Automatic Control, vol. 57, No. 1, Jan. 2012, pp. 230-236.
K. Pakki et al., "Square Root Cubature Information Filter", IEEE Sensors Journal, vol. 13, No. 2, Feb. 2013, pp. 750-758.
K. Pakki, et al., "Cubature H(Inifnty) Information Filter", European Control Conference, Zurich Switzerland, Jul. 17-19, 2013, pp. 2639-2644.
D. Simon, "From Here to Infinity", Embedded Systems Programming, Jul. 2000, pp. 2-9.
D.W. Casbeer et al., "Distributed Information Filtering Using Consensus Filters", American Control Conference, St. Louis, MO, Jun. 10-12, 2009, pp. 1882-1887.
V. P. Bhuvana et al., "Distributed Object Tracking based on Square Root Cubature H-infinity Information Filter", IEEE, 2014, pp. 1-6.
Kamal et al., "Information Weighted Consensus Filters and their Application in Distributed Camera Networks," IEEE Transactions on Automatic Control, vol. 58, Issue 12, Date of Publ.—Aug. 7, 2013, pp. 15.
Pakki et al., "Cubature Information Filter and Its Applications," 2011 American Control Conference, Jun. 29-Jul. 1, 2011, pp. 3609-3614.
Final Office Action from related U.S. Appl. No. 15/476,208, dated Oct. 3, 2019.

\* cited by examiner

TRACKING A TARGET MOVING BETWEEN STATES IN AN ENVIRONMENT

TECHNOLOGICAL FIELD

The present disclosure relates generally to tracking a target moving between states in an environment and, in particular, to tracking the target using consensus cubature and H-infinity filter information.

BACKGROUND

In the context of tracking objects or targets, surveillance platforms are utilized in the air, sea or on the ground, to provide accurate locations and paths of targets that are observed by the platforms. This is particularly challenging when the objects or targets being tracked are moving targets and their paths are not strictly linear. Current tracking systems compromise accuracy as a result of using linearized approximations to predict object paths which has a tendency to overweigh noise or outlier readings. Furthermore, in instances that involve non-linear paths, the current tracking systems fail to provide an efficient means for sharing information between surveillance platforms. Therefore, it may be desirable to have a system and method that take into account at least some of the issues discussed above, as well as possibly other issues.

BRIEF SUMMARY

Example implementations of the present disclosure are directed to an improved system, method and computer-readable storage medium for tracking a target moving between states in an environment. The system provides for decentralized tracking of target using a plurality of tracking systems such that communication with a central server is avoided. This allows for consistent and robust target tracking as efficient communication between the tracking systems reduces computational time and resources. Additionally, tracking errors are reduced by using consensus filter information derived from the plurality of tracking systems.

In some example implementations, a method is provided for tracking a target moving between states in an environment including at least a current state i and an upcoming state i+1. The method comprises an iterative process performed at an apparatus tracking the target. Each of a least some of a plurality of iterations of the method includes the following steps. The method includes receiving sensor data for the current state i. The method also comprises applying a cubature information filter to the sensor data and a measure of error of a previous prediction of the current state i to produce an estimate for the upcoming state i+1 and a measure of error thereof. The method also includes applying an H-infinity filter to the sensor data to exclude an outlier thereof and thereby decreasing the measure of error for the estimate for the upcoming state i+1 and producing an adjusted measure of error thereof.

The method also includes receiving from at least one second apparatus also tracking the target, at least one second estimate for the upcoming state i+1 and at least one second adjusted measure of error thereof. The method also includes defining a consensus estimate of the upcoming state i+1 and a consensus adjusted measure of error thereof from the estimate and the adjusted measure of error thereof, and the at least one second estimate and the at least one second adjusted measure of error thereof. The method also includes applying the cubature information filter to the consensus estimate of the upcoming state i+1 and the consensus adjusted measure of error thereof to produce a prediction of the upcoming state i+1 and a measure of error thereof. In at least one instance, the method also includes moving in the environment based on the prediction of the upcoming state i+1.

In some example implementations of the method of the preceding or any subsequent example implementation, or any combination thereof, in an iteration in which the current state i is a first state of the target, applying the cubature information filter to the sensor data includes applying the cubature information filter to the sensor data and a null value for the measure of error of the previous prediction of the current state i.

In some example implementations of the method of any preceding or any subsequent example implementation, or any combination thereof, in an iteration in which the current state i is a second or later state of the target and the sensor data that describes the current state i has a null value, applying the cubature information filter to the sensor data includes applying the cubature information filter to the previous prediction of the current state i and the corresponding measure of error thereof.

In some example implementations of the method of any preceding or any subsequent example implementation, or any combination thereof, defining the consensus estimate of the upcoming state i+1 and the consensus adjusted measure of error thereof includes producing an average of the estimate and the at least one second estimate for the upcoming state i+1 and thereby the consensus estimate of the upcoming state i+1; and producing an average of the adjusted measure of error and the at least one second adjusted measure of error and thereby the consensus adjusted measure of error of the upcoming state i+1.

In some example implementations of the method of any preceding or any subsequent example implementation, or any combination thereof, the method further comprises transmitting the estimate for the upcoming state i+1 and the adjusted measure of error thereof to the at least one second apparatus configured to threat define another consensus estimate of the upcoming state i+1 and another consensus adjusted measure of error thereof.

In some example implementations of the method of any preceding or any subsequent example implementation, or any combination thereof, the method further comprises producing the prediction of the upcoming state i+1 before receiving sensor data for the upcoming state i+1 in a next iteration of the iterative process.

In some example implementations of the method of any preceding or any subsequent example implementation, or any combination thereof, a position, heading or speed of the apparatus effect a likelihood of error associated with sensor data received thereat, and moving in the environment includes altering the position, heading or speed thereof to reduce the likelihood of error associated with sensor data for the upcoming state i+1 that the apparatus is caused to receive in a next iteration of the iterative process.

In some example implementations, an apparatus is provided for tracking a target moving between states in an environment. The apparatus comprises a processor and a memory storing executable instructions that, in response to execution by the processor, cause the apparatus to implement a number of subsystems, such as a sensor system, filter engine and consensus engine that may be configured to at least perform the method of any preceding example implementation, or any combination thereof.

In some example implementations, a computer-readable storage medium is provided for tracking a target moving between states in an environment. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
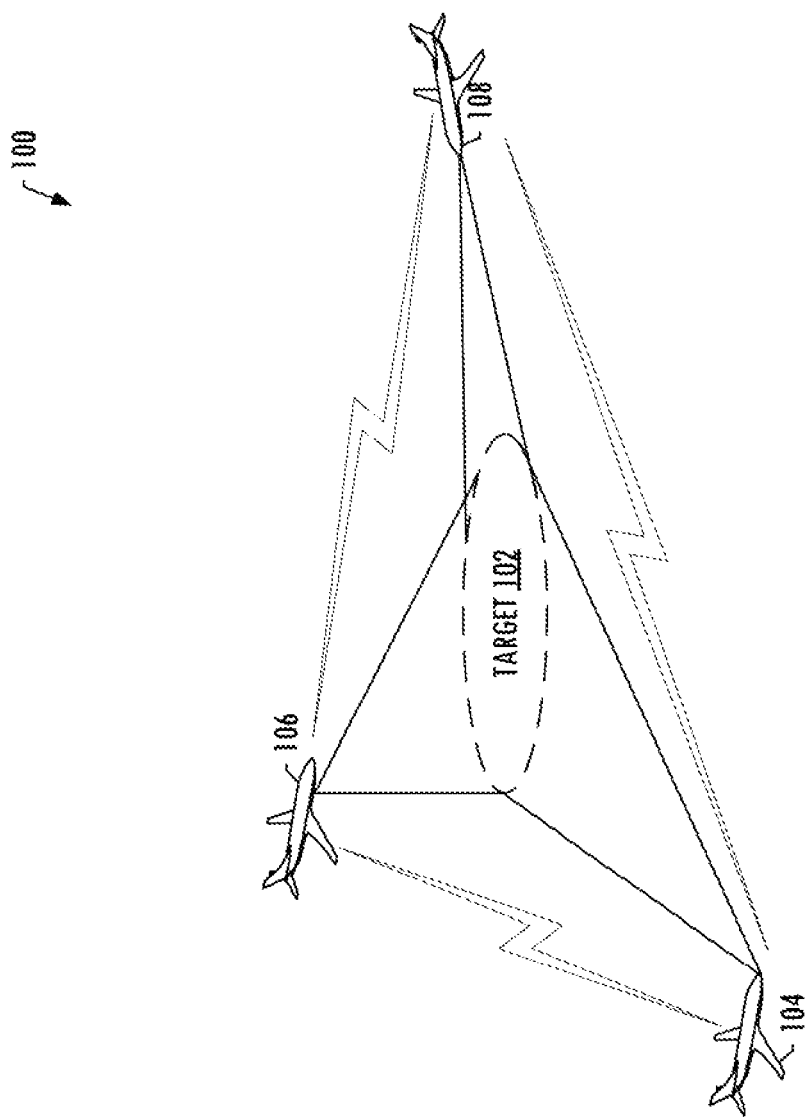
FIG. 1 is an illustration of a system for tracking a target moving between states in an environment, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to tracking a target moving between states in an environment and, in particular, to tracking the target using consensus cubature and H-infinity filter information. Example implementations will be primarily described in conjunction with applications for target tracking systems. It should be understood, however, that example implementations may be utilized in conjunction with a variety of other applications, such as other applications within the aerospace industry and outside of the aerospace industry.

Example implementations of the present disclosure are directed to accurate tracking of targets moving in non-linear paths as the targets are observed from multiple tracking systems (e.g., surveillance or sensing platforms) likely to have noisy observations. To this end, example implementations of the present disclosure provide a system and method for target localization and tracking from multiple sensing platforms. By integrating three different types of filtering methods (e.g., cubature information, H-infinity and consensus filter), target localization and tracking errors are reduced. The system combines object detection information from multiple sensing platforms to achieve consensus estimates for predicting paths of moving targets using fully decentralized processing while matching the accuracy of centralized methods.

In other terms, the system of the present disclosure is configured to predict the upcoming state of a target and a corresponding measure of error thereof independent of communication with a central processing system. That is, the system is configured to predict the upcoming state of the target based only on consensus information derived from estimates for the upcoming state in which the estimates are calculated by the system itself and other systems located proximate thereto.

FIG. 1 illustrates a system 100 for tracking a target 102 moving between states in an environment according to example implementations of the present disclosure, which may simply be referred to as the "system" herein. As shown, the system may comprise a plurality of systems (e.g., a swarm of unmanned aerial vehicles (UAVs)) for tracking the target including at least first, second and third tracking systems 104, 106, 108 communicably coupled to one another. In accordance with example implementations of the present disclosure, the system is configured to perform various functions or operations to track a target moving between states in an environment in which the states include at least a current state i and an upcoming state i+1. The system is configured to track the target between the states using an iterative process. That is, the system is configured to implement a plurality of iterations, each of which includes a number of steps for tracking the target.

Figure 2:
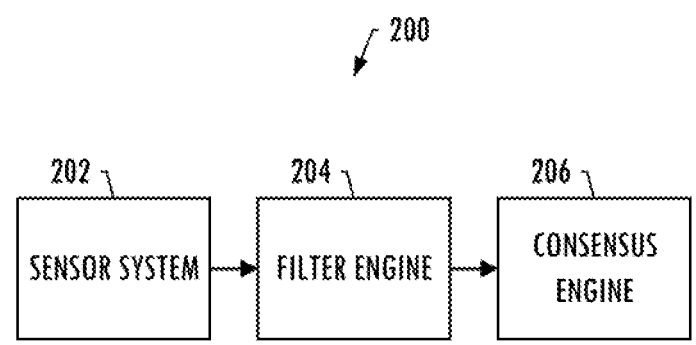
FIG. 2 is a more particular illustration of the system of FIG. 1, according to example implementations of the present disclosure.

Now referring to FIG. 2, FIG. 2 illustrates a suitable tracking system 200 that may correspond to any one of the tracking systems 104, 106 or 108 of FIG. 1. The tracking system may be configured to perform a number of different functions or operations, either automatically, under direct operator control, or some combination of thereof. In this regard, the tracking system may be configured to perform one or more of its functions or operations automatically, that is, without being directly controlled by an operator. Additionally or alternatively, the system may be configured to perform one or more of its functions or operations under direct operator control.

The tracking system 200 may include one or more of each of a number of different subsystems (each an individual system) coupled to one another for performing one or more functions or operations. As shown in FIG. 2, for example, the tracking system may include a sensor system 202, filter engine 204, and consensus engine 206 that may be coupled to one another. Although shown as part of the tracking system, the sensor system, filter engine or consensus engine may instead be separate from but in communication with the tracking system. It should also be understood that either of the subsystems may function or operate as a separate system without regard to others of the subsystems. And further, it should be understood that the tracking system may include one or more additional or alternative subsystems than those shown in FIG. 2.

As explained in greater detail below, the sensor system 202, filter engine 204 and consensus engine 206 may be configured to perform respective functions or operations of the tracking system 200 to track a target moving between states in an environment that include at least a current state i and an upcoming state i+1. Each state is described by at least a position, heading and speed of the target. For each iteration, the sensor system is configured to receive sensor data for the current state i. As previously indicated, the system 100, and more particularly the tracking systems therein, is configured to track the target between the states using an iterative process. That is, the tracking system is configured to implement a plurality of iterations, each of which includes a number of steps for tracking the target. In some examples, for each iteration that has a next iteration thereafter, the tracking system is configured to produce a prediction of the upcoming state i+1 before receipt of sensor data for the upcoming state i+1 in a next iteration of the iterative process.

The filter engine 204 is configured to apply a cubature information filter to the sensor data and a measure of error of a previous prediction of the current state i. Based thereon, the filter engine is configured to produce an estimate for the upcoming state i+1 and a measure of error thereof. The measure of error is based on at least noise associated with the sensor data. In some examples, in an iteration in which the current state i is a first state of the target, the filter engine is configured to apply the cubature information filter to the sensor data and a null value for the measure of error of the previous prediction of the current state i.

As discussed herein, applying a cubature information filter may include generating cubature information for a number n of states of the target including the current state i. The filter engine 204 may generate 2n cubature points in which the cubature points are sample points around the previous prediction of the current state i with respect to the corresponding measure of error thereof. The cubature points are then propagated using a transition matrix to product the estimate for the upcoming state i+1 which may be based on an average of the cubature points. The cubature points may also be utilized to produce the measure of error of the estimate for the upcoming state i+1.

Further, in some examples, in an iteration in which the current state i is a second or later state of the target and the sensor data that describes the current state i has a null value, the filter engine 204 is configured to apply the cubature information filter to the previous prediction of the current state i and the corresponding measure of error thereof. In other terms, in each of these example iterations, the filter engine is configured to produce the estimate for the upcoming state i+1 independent of receiving a previous prediction of the current state or sensor data for a new observation of the target.

After producing the estimate for the upcoming state i+1 and a measure of error thereof, the filter engine 204 is then configured to produce an adjusted measure of error for the upcoming state i+1. More specifically, the filter engine is configured to apply an H-infinity filter to the sensor data to exclude an outlier thereof and thereby decrease the measure of error for the estimate for the upcoming state i+1 in which the decreased measure of error corresponds to the adjusted measure of error for the upcoming state i+1. The H-infinity filter may be utilized to produce conservative measures of error.

As discussed herein, applying an H-infinity filter may include establishing a performance measure based on the states of the target, noise associated with the sensor data, and a measure of error of the noise. Using the performance measure, the filter engine 204 may produce an error bound having a supremum value in which the supremum value may be used to adjust the measure of error for the estimate for the upcoming state i+1 with a tighter bound while excluding outliers of the sensor data.

The consensus engine 206 is configured to receive a second estimate for the upcoming state i+1 and a second adjusted measure of error thereof from a second system also tracking the target. The consensus is then configured to define a consensus estimate of the upcoming state i+1 and a consensus adjusted measure of error thereof from the estimate and the adjusted measure of error thereof, and the second estimate and the second adjusted measure of error thereof. In some implementations, the consensus engine is further configured to transmit the estimate for the upcoming state i+1 and the adjusted measure of error thereof to at least a second tracking system that is also tracking the target. The second tracking system is then configured to threat define another consensus estimate of the upcoming state i+1 and another consensus adjusted measure of error thereof.

In some example, defining the consensus estimate of the upcoming state i+1 and the consensus adjusted measure of error thereof includes the consensus engine 206 being configured to produce an average of the estimate and the second estimate for the upcoming state i+1 and thereby the consensus estimate of the upcoming state i+1, and produce an average of the adjusted measure of error and the second adjusted measure of error and thereby the consensus adjusted measure of error of the upcoming state i+1.

Thereafter, the filter engine 204 is further configured to apply the cubature information filter to produce a prediction of the upcoming state i+1 and a measure of error thereof. In particular, the filter engine is configured to apply the cubature information filter to the consensus estimate of the upcoming state i+1 and the consensus adjusted measure of error thereof to produce the prediction and measure of error of the prediction. In at least one instance, the tracking system 200 is configured to move in the environment based on the prediction of the upcoming state i+1. In some examples, the position, heading or speed of the tracking system effects a likelihood of error associated with sensor data received thereat. In these examples, the tracking system is caused to move in the environment, and more particularly, alter the position, heading or speed thereof to reduce the likelihood of error associated with sensor data for the upcoming state i+1 that the sensor system 202 receives in a next iteration of the iterative process.

It should be noted that although the example implementations herein are discussed with reference to a second tracking system that is also tracking the target, the consensus engine 206 may receive a plurality of estimates for the upcoming state i+1 and adjusted measures of error thereof from a respective plurality of tracking systems that are also tracking the target and include the first and second tracking system. In these examples, the consensus engine is configured to define the consensus estimate of the upcoming state i+1 and a consensus adjusted measure of error thereof from the plurality of estimates for the upcoming state i+1 and adjusted measures of error thereof.

Figure 3:
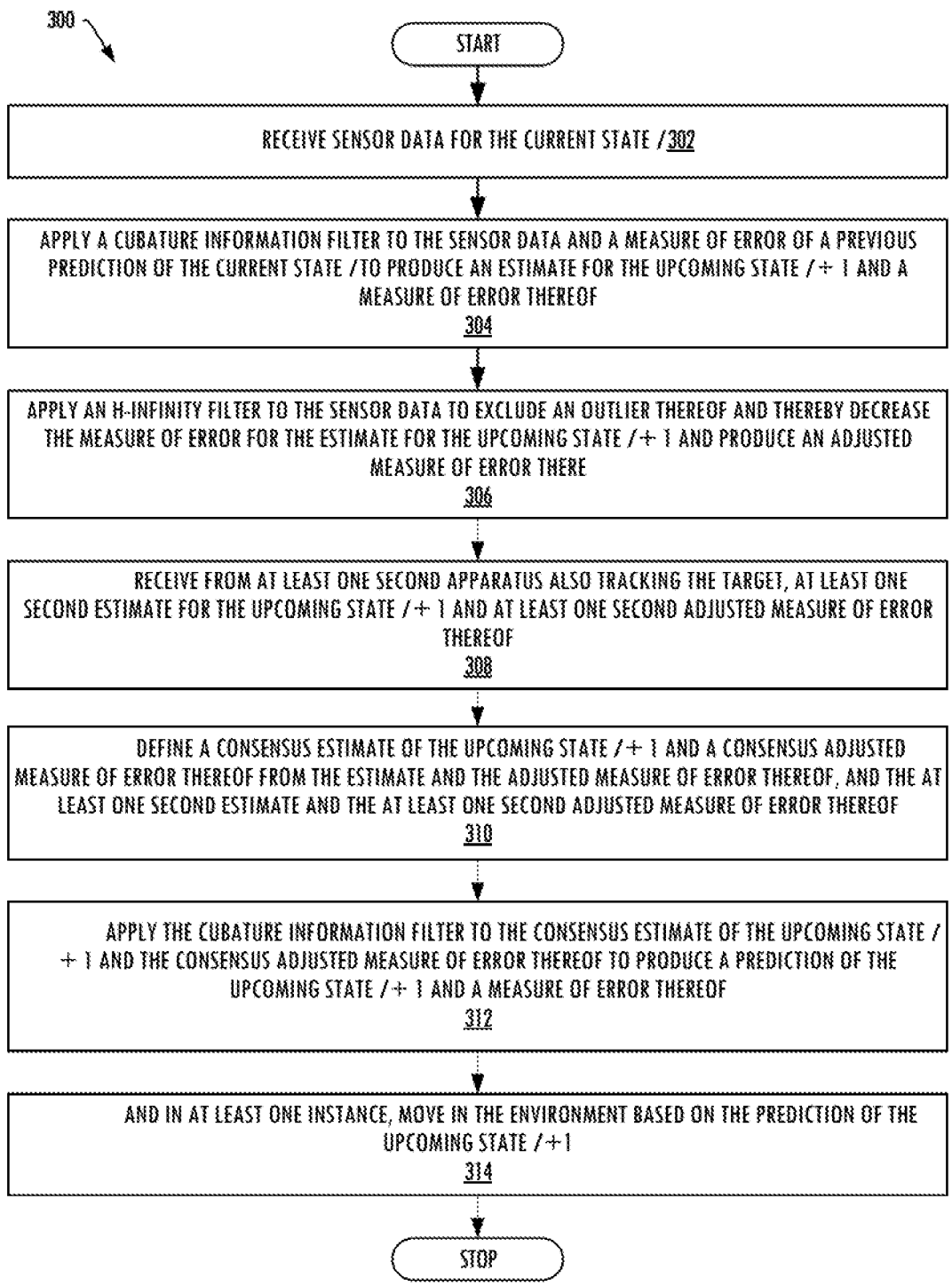
FIG. 3 is a flow diagram illustrating various operations of a method for tracking a target moving between states in an environment, in accordance with an example implementation.

FIG. 3 illustrates a flowchart including various operations of a method 300 for tracking a target moving between states in an environment including at least a current state i and an upcoming state i+1. As shown at block 302, the method includes receiving sensor data for the current state i, and applying a cubature information filter to the sensor data and a measure of error of a previous prediction of the current state i to produce an estimate for the upcoming state i+1 and a measure of error thereof, as shown in block 304. The method also includes applying an H-infinity filter to the sensor data to exclude an outlier thereof and thereby decrease the measure of error for the estimate for the upcoming state i+1 and produce an adjusted measure of error thereof, as shown in block 306.

As shown in block 308, the method also includes receiving from at least one second apparatus also tracking the target, at least one second estimate for the upcoming state i+1 and at least one second adjusted measure of error thereof. The method also includes defining a consensus estimate of the upcoming state i+1 and a consensus adjusted measure of error thereof from the estimate and the adjusted measure of error thereof, and the second estimate and the second adjusted measure of error thereof, as shown in block 310. As shown in block 312, the method also includes, applying the cubature information filter to the consensus estimate of the upcoming state i+1 and the consensus adjusted measure of error thereof to produce a prediction of the upcoming state i+1 and a measure of error thereof, and in at least one instance, moving in the environment based on the prediction of the upcoming state i+1, as shown in block 314.

According to example implementations of the present disclosure, the system 100, suitable tracking system 200 and its subsystems and/or components including the sensor system 202, filter engine 204 and consensus engine 206 may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 4:
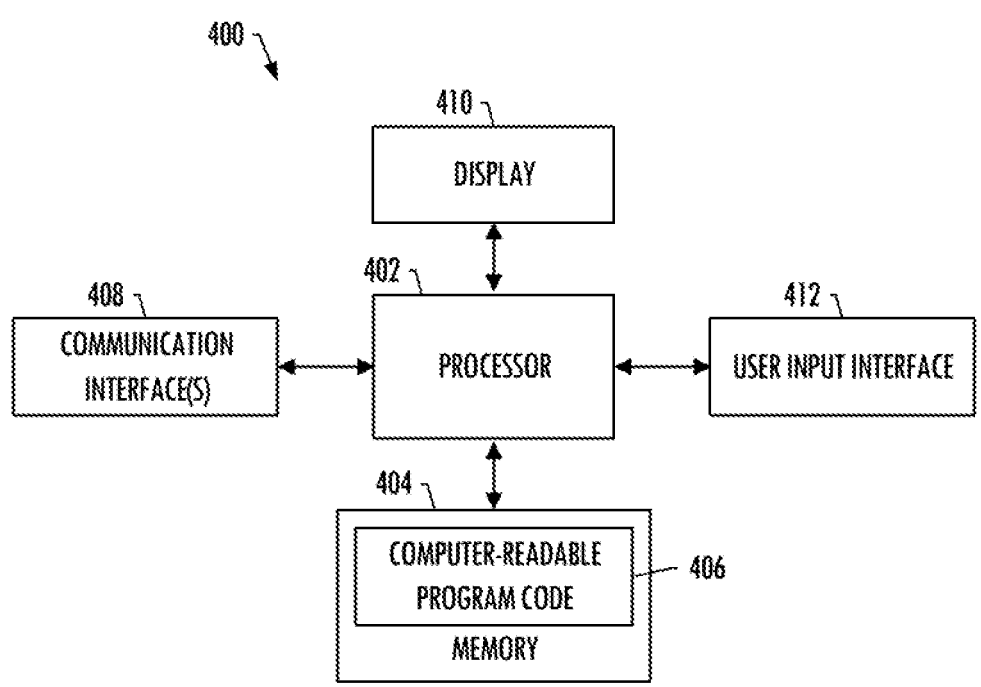
FIG. 4 illustrates an apparatus according to some example implementations.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 402 (e.g., processor unit) connected to a memory 404 (e.g., storage device).

The processor 402 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 404 (of the same or another apparatus).

The processor 402 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like.

The user input interfaces 412 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 402 and a computer-readable storage medium or memory 404 coupled to the processor, where the processor is configured to execute computer-readable program code 406 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for tracking a target moving between states in an environment including at least a current state i and an upcoming state i+1, the apparatus comprising a processor and a memory storing executable instructions that, in response to execution by the processor, cause the apparatus to implement an iterative process for tracking the target, each of at least some of a plurality of iterations including the apparatus being caused to:

receive sensor data for the current state i;

apply a cubature information filter to the sensor data and a measure of error of a previous prediction of the current state i to produce an estimate for the upcoming state i+1 and a measure of error thereof;

apply an H-infinity filter to the sensor data to exclude an outlier thereof and thereby decrease the measure of error for the estimate for the upcoming state i+1 and produce an adjusted measure of error thereof;

receive from at least one second apparatus also tracking the target, at least one second estimate for the upcoming state i+1 and at least one second adjusted measure of error thereof;

define a consensus estimate of the upcoming state i+1 and a consensus adjusted measure of error thereof from the estimate and the adjusted measure of error thereof, and the at least one second estimate and the at least one second adjusted measure of error thereof;

apply the cubature information filter to the consensus estimate of the upcoming state i+1 and the consensus adjusted measure of error thereof to produce a prediction of the upcoming state i+1 and a measure of error thereof; and in at least one instance, move the apparatus in the environment based on the prediction of the upcoming state i+1.

2. The apparatus of claim 1, wherein in an iteration in which the current state i is a first state of the target, the apparatus being caused to apply the cubature information filter to the sensor data includes being caused to apply the cubature information filter to the sensor data and a null value for the measure of error of the previous prediction of the current state i.

3. The apparatus of claim 1, wherein in an iteration in which the current state i is a second or later state of the target and the sensor data that describes the current state i has a null value, the apparatus being caused to apply the cubature information filter to the sensor data includes being caused to apply the cubature information filter to the previous prediction of the current state i and the corresponding measure of error thereof.

4. The apparatus of claim 1, wherein the apparatus being caused to define the consensus estimate of the upcoming state i+1 and the consensus adjusted measure of error thereof includes being caused to:
  produce an average of the estimate and the at least one second estimate for the upcoming state i+1 and thereby the consensus estimate of the upcoming state i+1; and
  produce an average of the adjusted measure of error and the at least one second adjusted measure of error and thereby the consensus adjusted measure of error of the upcoming state i+1.

5. The apparatus of claim 1, wherein the memory stores further executable instructions that, in response to execution by the processor, cause the apparatus to further at least:
  transmit the estimate for the upcoming state i+1 and the adjusted measure of error thereof to the at least one second apparatus configured to thereat define another consensus estimate of the upcoming state i+1 and another consensus adjusted measure of error thereof.

6. The apparatus of claim 1, wherein for the apparatus is caused to produce the prediction of the upcoming state i+1 before receipt of sensor data for the upcoming state i+1 in a next iteration of the iterative process.

7. The apparatus of claim 1, wherein a position, heading or speed of the apparatus effect a likelihood of error associated with sensor data received thereat, and the apparatus being caused to move in the environment includes apparatus being caused to alter the positon, heading or speed thereof to reduce the likelihood of error associated with sensor data for the upcoming state i+1 that the apparatus is caused to receive in a next iteration of the iterative process.

8. A method for tracking a target moving between states in an environment including at least a current state i and an upcoming state i+1, the method comprising an iterative process, at an apparatus tracking the target, each of at least some of a plurality of iterations of the method including:
  receiving sensor data for the current state i;
  applying a cubature information filter to the sensor data and a measure of error of a previous prediction of the current state i to produce an estimate for the upcoming state i+1 and a measure of error thereof;
  applying an H-infinity filter to the sensor data to exclude an outlier thereof and thereby decreasing the measure of error for the estimate for the upcoming state i+1 and producing an adjusted measure of error thereof;
  receiving from at least one second apparatus also tracking the target, at least one second estimate for the upcoming state i+1 and at least one second adjusted measure of error thereof;
  defining a consensus estimate of the upcoming state i+1 and a consensus adjusted measure of error thereof from the estimate and the adjusted measure of error thereof, and the at least one second estimate and the at least one second adjusted measure of error thereof;
  applying the cubature information filter to the consensus estimate of the upcoming state i+1 and the consensus adjusted measure of error thereof to produce a prediction of the upcoming state i+1 and a measure of error thereof; and in at least one instance,
  moving the apparatus in the environment based on the prediction of the upcoming state i+1.

9. The method of claim 8 wherein in an iteration in which the current state i is a first state of the target, applying the cubature information filter to the sensor data includes applying the cubature information filter to the sensor data and a null value for the measure of error of the previous prediction of the current state i.

10. The method of claim 8, wherein in an iteration in which the current state i is a second or later state of the target and the sensor data that describes the current state i has a null value, applying the cubature information filter to the sensor data includes applying the cubature information filter to the previous prediction of the current state i and the corresponding measure of error thereof.

11. The method of claim 8, wherein defining the consensus estimate of the upcoming state i+1 and the consensus adjusted measure of error thereof includes:
  producing an average of the estimate and the at least one second estimate for the upcoming state i+1 and thereby the consensus estimate of the upcoming state i+1; and
  producing an average of the adjusted measure of error and the at least one second adjusted measure of error and thereby the consensus adjusted measure of error of the upcoming state i+1.

12. The method of claim 8 further comprising transmitting the estimate for the upcoming state i+1 and the adjusted measure of error thereof to the at least one second apparatus configured to thereat define another consensus estimate of the upcoming state i+1 and another consensus adjusted measure of error thereof.

13. The method of claim 8 further comprising producing the prediction of the upcoming state i+1 before receiving sensor data for the upcoming state i+1 in a next iteration of the iterative process.

14. The method of claim 8, wherein a position, heading or speed of the apparatus effect a likelihood of error associated with sensor data received thereat, and moving in the environment includes altering the positon, heading or speed thereof to reduce the likelihood of error associated with sensor data for the upcoming state i+1 that the apparatus is caused to receive in a next iteration of the iterative process.

15. A computer-readable storage medium for tracking a target moving between states in an environment including at least a current state i and an upcoming state i+1, the computer-readable storage medium having computer-readable program code stored therein that, in response to execution by a processor, cause the apparatus to implement an iterative process for tracking the target, each of a least some of a plurality of iterations including the apparatus being cause to:
  receive sensor data for the current state i;
  apply a cubature information filter to the sensor data and a measure of error of a previous prediction of the current state i to produce an estimate for the upcoming state i+1 and a measure of error thereof;
  apply an H-infinity filter to the sensor data to exclude an outlier thereof and thereby decrease the measure of error for the estimate for the upcoming state i+1 and produce an adjusted measure of error thereof;
  receive from at least one second apparatus also tracking the target, at least one second estimate for the upcoming state i+1 and at least one second adjusted measure of error thereof;
  define a consensus estimate of the upcoming state i+1 and a consensus adjusted measure of error thereof from the estimate and the adjusted measure of error thereof, and the at least one second estimate and the at least one second adjusted measure of error thereof;
  apply the cubature information filter to the consensus estimate of the upcoming state i+1 and the consensus adjusted measure of error thereof to produce a prediction of the upcoming state i+1 and a measure of error thereof; and in at least one instance, move the apparatus in the environment based on the prediction of the upcoming state i+1.

16. The computer program product of claim 15, wherein in an iteration in which the current state i is a first state of the target, the apparatus being caused to apply the cubature information filter to the sensor data includes being caused to apply the cubature information filter to the sensor data and a null value for the measure of error of the previous prediction of the current state i.

17. The computer program product of claim 15, wherein in an iteration in which the current state i is a second or later state of the target and the sensor data that describes the current state i has a null value, the apparatus being caused to apply the cubature information filter to the sensor data includes being caused to apply the cubature information filter to the previous prediction of the current state i and the corresponding measure of error thereof.

18. The computer program product of claim 15, wherein the apparatus being caused to define the consensus estimate of the upcoming state i+1 and the consensus adjusted measure of error thereof includes being caused to:
produce an average of the estimate and the at least one second estimate for the upcoming state i+1 and thereby the consensus estimate of the upcoming state i+1; and
produce an average of the adjusted measure of error and the at least one second adjusted measure of error and thereby the consensus adjusted measure of error of the upcoming state i+1.

19. The computer program product of claim 15 having computer-readable program code stored therein that, in response to execution by a processor, causes the apparatus to further at least:
transmit the estimate for the upcoming state i+1 and the adjusted measure of error thereof to the at least one second apparatus configured to thereat define another consensus estimate of the upcoming state i+1 and another consensus adjusted measure of error thereof.

20. The computer program product of claim 15 wherein the apparatus is caused to produce the prediction of the upcoming state i+1 before receipt of sensor data for the upcoming state i+1 in a next iteration of the iterative process.

21. The computer program product of claim 15, wherein a position, heading or speed of the apparatus effect a likelihood of error associated with sensor data received thereat, and the apparatus being caused to move in the environment includes apparatus being caused to alter the positon, heading or speed thereof to reduce the likelihood of error associated with sensor data for the upcoming state i+1 that the apparatus is caused to receive in a next iteration of the iterative process.

* * * * *